FIG. 1

INVENTORS
EDWIN H. GOFFE
DONALD J. ROWLEY

United States Patent Office 2,884,190
Patented Apr. 28, 1959

2,884,190

OPERATION CONTROL MEANS

Edwin H. Goffe, Norwood, and Donald J. Rowley, North Providence, R.I., assignors to Monroe Calculating Machine Company, Orange, N.J., a corporation of Delaware Application May 26, 1953, Serial No. 357,454

14 Claims. (Cl. 235—63)

The invention relates to operation control means for calculating machines, and particularly to such means for controlling a plurality of operations including registration and carriage shift. More specifically, the invention discloses means for controlling, sequentially, a multiplying operation, an operation of the carriage shifting mechanism to position the carriage in a predetermined position, and a division operation.

In the performance of certain work entailing a series of calculations, it is essential to register individually the result of each calculation, and also the sum or grand total of the series. To this end, certain calculating machines are provided with a pair of product dividend registers which are adapted for simultaneous registration of an amount resultant of a calculation. By provision of individually operable resetting mechanisms, one of the registers may be cleared while the registrations are retained in the other. Thus, a series of calculations may be performed with individual registration of each of the series in the one register and the sum or grand total accumulated in the other. Upon completion of the work, both registers may be cleared by the individual and unrelated operation of the respective resetting mechanisms.

Each of the product dividend registers of the above briefly described type of machine must be provided with differentially settable digital actuators and tens transfer mechanism. Such a type of machine is disclosed in Patent No. 2,617,594 issued on November 11, 1952 to Herman Gang. The machine of this patent is commonly known as a dual carriage machine, in which one product dividend or sub-total register and a multiplier quotient register are mounted in a lower carriage, and the other product-dividend or grand total register is mounted in an upper carriage.

The present invention is embodied in a machine having a single carriage in which is mounted a product dividend register and a pair of axially aligned multiplier quotient registers. The devices of the invention provide for the control, in sequence, of a multiplying operation to register a product in the product dividend register, the shifting of the carriage to a preselected position, and the division of the product by one. The quotient which will be of the same value as the product is registered in each of the multiplier quotient registers. A split clearing arrangement provides that one of the multiplier quotient registers may be cleared while the value is retained in the other. Thus, the sum of a plurality of products may be registered in said other register. The devices of the invention, therefore, effect an economy of mechanisms by providing for the individual registration of each one of a series of calculations and the sum of the series in a machine having a single carriage and a single product dividend register. The invention, however, will best be understood from the following description with reference to the accompanying drawings in which:

*General description of the machine*

The mechanisms and their operations described in the following are cooperatively associated with the devices of the invention. Reference is made to the patents noted in connection therewith for the details of structure and operation.

Mounted in the denominational shiftable register carriage 1 (Figs. 1, 2, 3 and 4) is a product-dividend register comprising the numeral wheels 2 and a pair of multiplier quotient registers comprising the wheels 3 and 4 respectively mounted on a common axis. Digital values set on keys 6 of the keyboard are registered in wheels 2 of the product dividend register upon each cycle of operation of differentially settable actuators 7 and tens transfer actuators 8 (Fig. 3) in accordance with the disclosure of Patent No. 2,531,207 issued to Herman Gang on November 21, 1950.

The actuators for the multiplier quotient wheels 4 comprise a counting finger 9 (Figs. 3, 3a and 4) which, depending on the position of carriage 1, is effective to register a count in one of the wheels 4 upon each cycle of operation of the actuators. Fingers 9a provide for tens transfer so that the sum of a plurality of calculations may be registered in wheels 4. The fingers 9 and 9a are operated substantially as set forth in Patent No. 2,273,237 to Edward C. Walters. Cam 10 (Figs. 3 and 3a) controls vertical movement of fingers 9 and 9a, and cam 11 or cam 12 is adjustable into driving engagement with the fingers to effect registration, like or unlike, respectively, the registration in the product dividend register.

Figure 1:
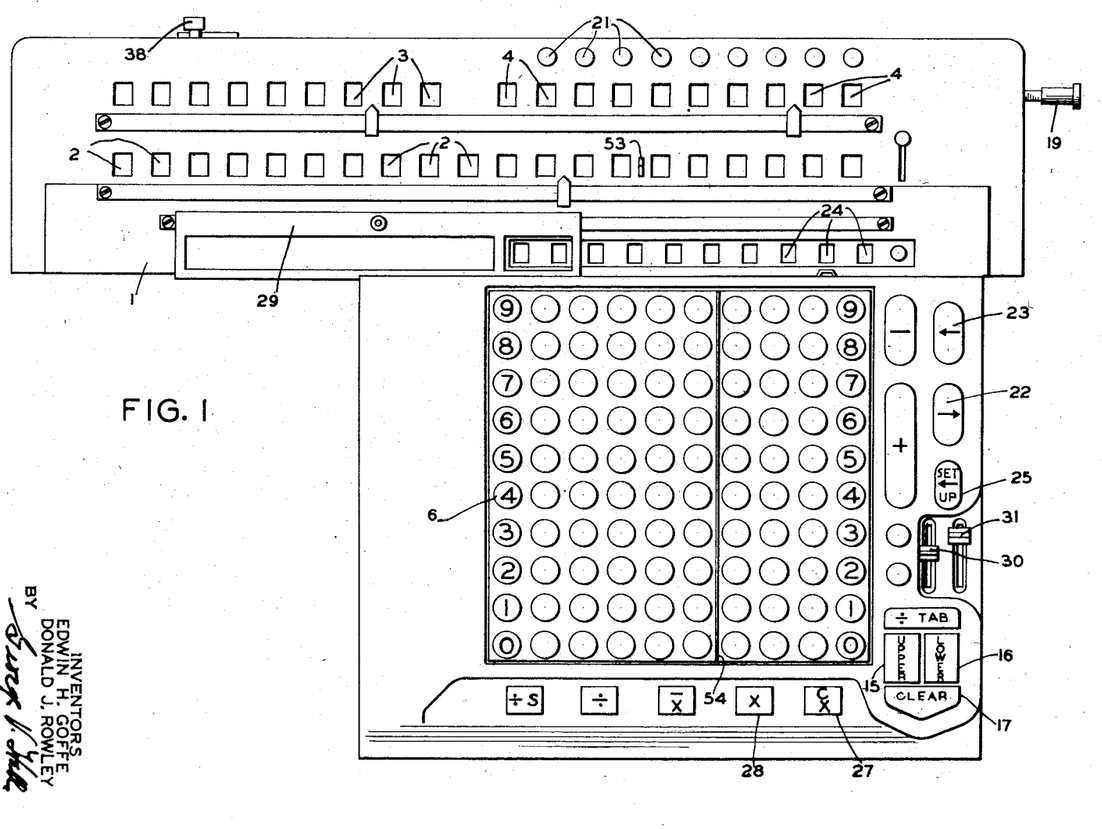
Fig. 1 is a plan view of a calculating machine embodying the invention.
Figure 2:
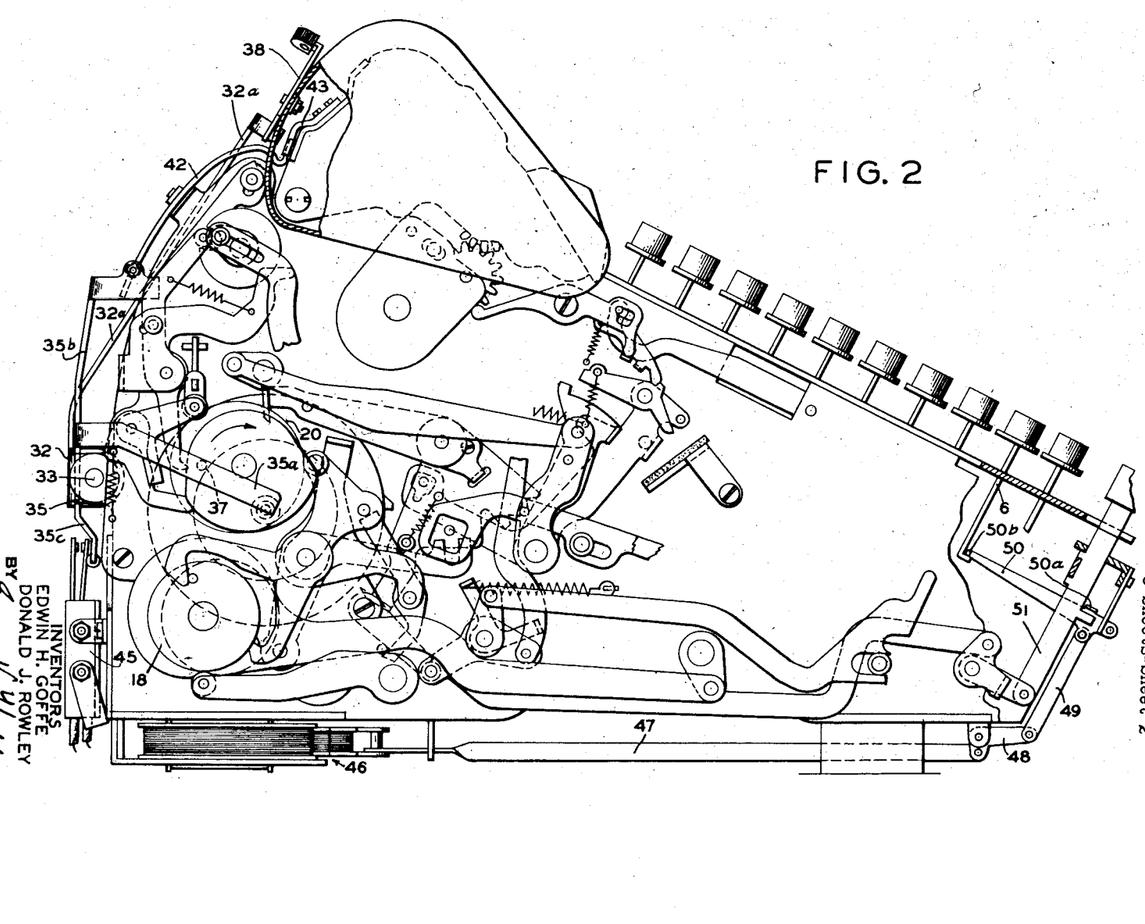
Fig. 2 is a left side view of the machine showing parts of the carriage shift control means associated with devices of the invention, the clearout clutch and the division initiating mechanism.

A single counting finger 14 (Fig. 4) is provided for multiplier quotient wheels 3 (Fig. 1). As hereinafter described, wheels 3 will be cleared after each calculation in conjunction with the devices of the invention and as the digit "9" will be the maximum registration in any one wheel, there is no necessity for tens transfer as in the case of wheels 4. Counting finger 14 is operated in unison with fingers 9 and 9a by cams 10, 11 and 12. A disc is mounted adjacent the intermediate drive gear of each wheel 3. When the gears are shifted into the range of fingers 9a, the fingers will engage the peripheries of the discs to prevent their engagement with the gears. Thus, registration will be effected in wheels 3 only by counting finger 14.

The multiplier quotient dials 3 and 4 (Fig. 1) are cleared upon depression of a key 15, the product dividend dials 2 are cleared upon depression of a key 16, and depressed keys 6 of the keyboard are released upon depression of a key 17. The clearing mechanism operates substantially as disclosed in Patent No. 2,531,206 issued to Herman Gang on November 21, 1950. Upon depression of each of the keys 15, 16 or 17, a slide is operated which selects the clearing operation and engages a clear clutch 18 (Fig. 2) which through a transmission train effects the clearing operation. The multiplier quotient dials 3 are invariably cleared upon operation of the transmission train for those dials. However, a split clearing arrangement provides that the wheels 4 may retain registered amounts while the wheels 3 are cleared. The split clearing arrangement may be of any well known construction such as, for example, disclosed in Fig. 6 of Patent No. 2,617,594 issued to Herman Gang on November 11, 1952. This arrangement provides that a square shaft, which is rocked to operate the clearing fingers for wheels 3, may be connected or disconnected from another shaft which when connected is rocked to clear wheels 4. This connection and disconnection is effected by a suitable knob 19 (Figs. 1 and 4) which is adapted to manually shift the clearing shaft for wheels 4 longitudinally.

The mechanism for denominationally shifting carriage 1 operates substantially in accordance with the disclosure of the aforenoted Patent No. 2,531,207. Upon initiation of a carriage shift a two-phase clutch 20 (Fig. 2) is operated a first step of movement and upon termination of the shift the clutch completes its cycle of operation. As will be hereinafter described, the operation of this shift control clutch is cooperatively associated with the operation of the devices of the invention.

A set tabular key 21 (Figs. 1 and 3) operates to terminate a carriage shift upon movement of the carriage into the position corresponding to the set key. The set tabular keys, however, are effective to terminate a shift only when the shift is initiated and maintained in response to depression of a shift key 22 or 23.

The value set on keys 6 of the keyboard may be entered into multiplier storage wheels 24 (Figs. 1 and 3) only with carriage 1 in its leftmost position. This multiplier entering operation is effected upon operation of mechanisms in accordance with the disclosure of the aforenoted Pat. No. 2,531,206. These mechanisms operate in response to depression of a key 25 in accordance with the disclosure of Pat. No. 2,572,920. If the carriage is in its leftmost position, depression of key 25 will forthwith initiate operation of the multiplier entering mechanism. However, if the carriage is displaced from its leftmost position, depression of key 25 will effect depression of left carriage shift key 23 and will trip the multiplier entering mechanism. The operation of the multiplier entering mechanism, however, will be held in abeyance until the carriage shift is terminated with the carriage in its leftmost position. As heretofore noted, a set tabular key 21 will terminate a carriage shift upon movement into the position corresponding to the key if the carriage shift is initiated in response to depression of a shift key 22, 23. Means therefore are provided which, upon depression of multiplier entering key 25 and the attendant depression of shift key 23, will disable a set tabular key 21 to terminate the shift. Therefore, the carriage shift will be terminated with the carriage in its left end position regardless of the setting of the tabular keys. This disabling mechanism, operable only in conjunction with multiplier entering key 25, operates as disclosed in Pat. No. 2,603,417 issued to H. W. Pinckney on July 15, 1952.

Multiplication is effected substantially as disclosed in the aforenoted Pat. No. 2,531,207. Certain ancillary operations are effected in conjunction with a multiplying operation upon depression of key 27 (Fig. 1). Upon depression of key 27, a clearing operation is effected for the multiplier quotient dials and for the product dials prior to the institution of the multiplying operation. These clearing operations are effected through the same mechanisms which were briefly described in connection with depression of clear keys 15, 16. The carriage is shifted toward the right during the multiplying operation and when the operation is concluded, an automatic operation of the keyboard releasing mechanism is effected. This operation is effected by the same mechanisms which are operated in response to depression of clear key 17. This keyboard clearing operation operates to rock an arm 28 (Fig. 3) which effects the depression of left shift key 23. The carriage 1 is, therefore, returned to its left end position or to the position corresponding to a set tabular key 21. Normally this keyboard clearing operation and carriage return is effected when the last multiplier digit stored in multiplier storage dials 24 is counted back to zero. Certain of the devices of the invention, however, as will be later described, are operable in response to the movement of carriage 1 into its right end position.

As disclosed in Pat. No. 2,531,208 issued to Herman Gang on November 21, 1950, a slide 29 (Fig. 1) is adjustable to cause carriage 1 to be shifted further toward the right to a selected position corresponding to the adjusted slide should the multiplying operation be concluded before the carriage has been shifted rightwardly to that position. This operation is effected so that a product registered in product wheels 2 may be transferred to certain of the multiplier storage dials 24, which transfer provides for correct registration of the sum of a plurality of products in the product wheels 2 with relation to a fixed decimal point, i.e., $a \times b \times c$. This transfer operation is effected following a multiplying operation in response to depression of a key 28, which multiplying operation does not provide for automatic carriage return. To provide for operation of the devices of the invention, slide 29 is adjusted to its leftmost position which provides that the carriage will be shifted to its rightmost position before the keyboard clearing and carriage return operations following a multiplying operation in response to key 27.

The division operation initiated as hereinafter described under control of the devices of the invention operates substantially as described in the aforenoted Pat. No. 2,531,207 upon depression of divide key 51.

Figures 3, 3A:
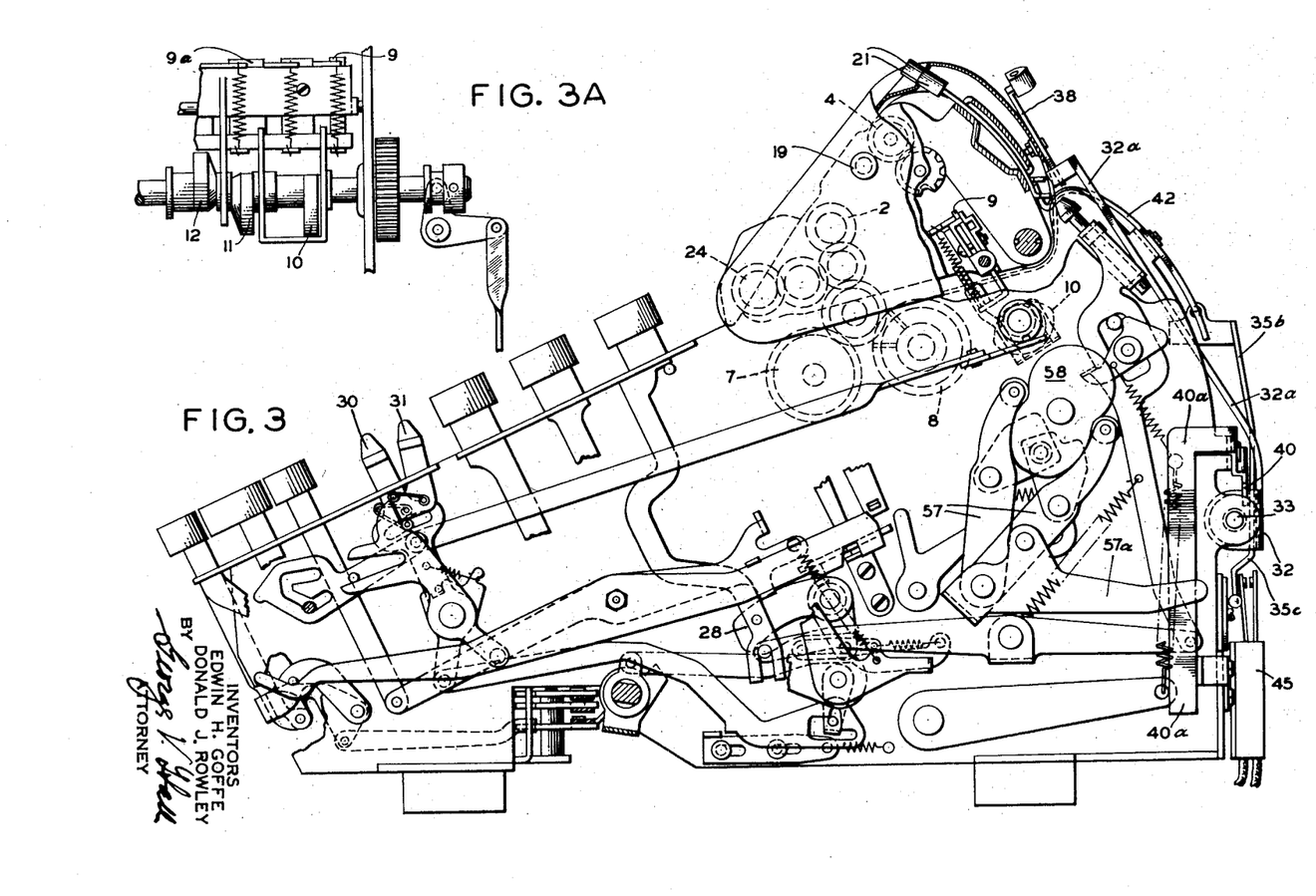
Fig. 3 is a right side elevation of the machine showing mechanisms with which the devices of the invention are cooperatively associated.
Fig. 3a is a fragmentary detail view showing the counter actuator adjusted to disabled position.

As heretofore briefly described, a product accumulated in wheels 2 is transferred to quotient dials 3, 4 upon division by the digit 1. It will be obvious, therefore, that provision must be made to prevent registration of the multiplier in the multiplier quotient dials 3, 4 as an incident to the multiplying operation. A change lever 30 is adapted for three settings. When the change lever is adjusted clockwise from the position shown in Fig. 3, cam 11 (Fig. 3a) is adjusted toward the left into position to drive counting fingers 9, 9a and 14 for like registration in wheels 3, 4. When the change lever is adjusted counterclockwise from the position shown in Fig. 3, cam 12 will be adjusted to operate the counting fingers to effect unlike registration. When the change lever is in the intermediate position shown in Figs. 3, cams 11 and 12 will be rendered ineffective as shown in Fig. 3a and no registration will be effected in the multiplier quotient dials. Normally, the change lever is set in clockwise direction from the position shown in Fig. 3 which is the proper position for multiplication in which like registration is effected in the multiplier quotient wheels.

Upon initiation of a division program, change lever 30 is automatically adjusted from its clockwise position to its counterclockwise position so that unlike count may be registered in multiplier quotient dials 3, 4 for the division operation. To disable the counting fingers for the multiplier quotient dials for a multiplying operation in connection with the devices of the invention, a lever 31 (Fig. 3) is adjusted clockwise to the position shown therein. This operates to move change lever 30 counterclockwise to its disabling intermediate position. Therefore, no registration will be effected in wheels 3, 4 during a multiplying operation with the change lever so set. However, upon initiation of a division program the change lever will be adjusted counterclockwise to provide for unlike count in the multiplier quotient dials during the division operation, and at the conclusion of the division operation it will be restored to its intermediate ineffective position. This change lever disabling mechanism operates as disclosed in Pat. No. 2,631,779 issued to H. M. Fleming and A. A. Overbury on March 17, 1953.

*The operation control devices*

A member 32 (Figs. 4 and 5) having an upstanding arm 32a is slidably mounted on a shaft 33 at the rear of the machine. A spring 34 normally holds member 32 toward the right (Fig. 4) toward the left (Fig. 5). A second member 35 is slidably and rockably mounted on shaft 33. A spring 36 normally urges member 35 toward the left (Fig. 4), toward the right (Fig. 5) into engagement with member 32. Spring 36, however, is relatively weak and spring 34, therefore, holds both members 32 and 35 in the position shown in the drawings. At the outer end of member 35 is an arm 35a extending toward the front of the machine and normally located a short distance outwardly from a pin 37 (Figs. 2, 4 and 5) which is mounted on a cam driven by shift control clutch 20.

Figure 4:
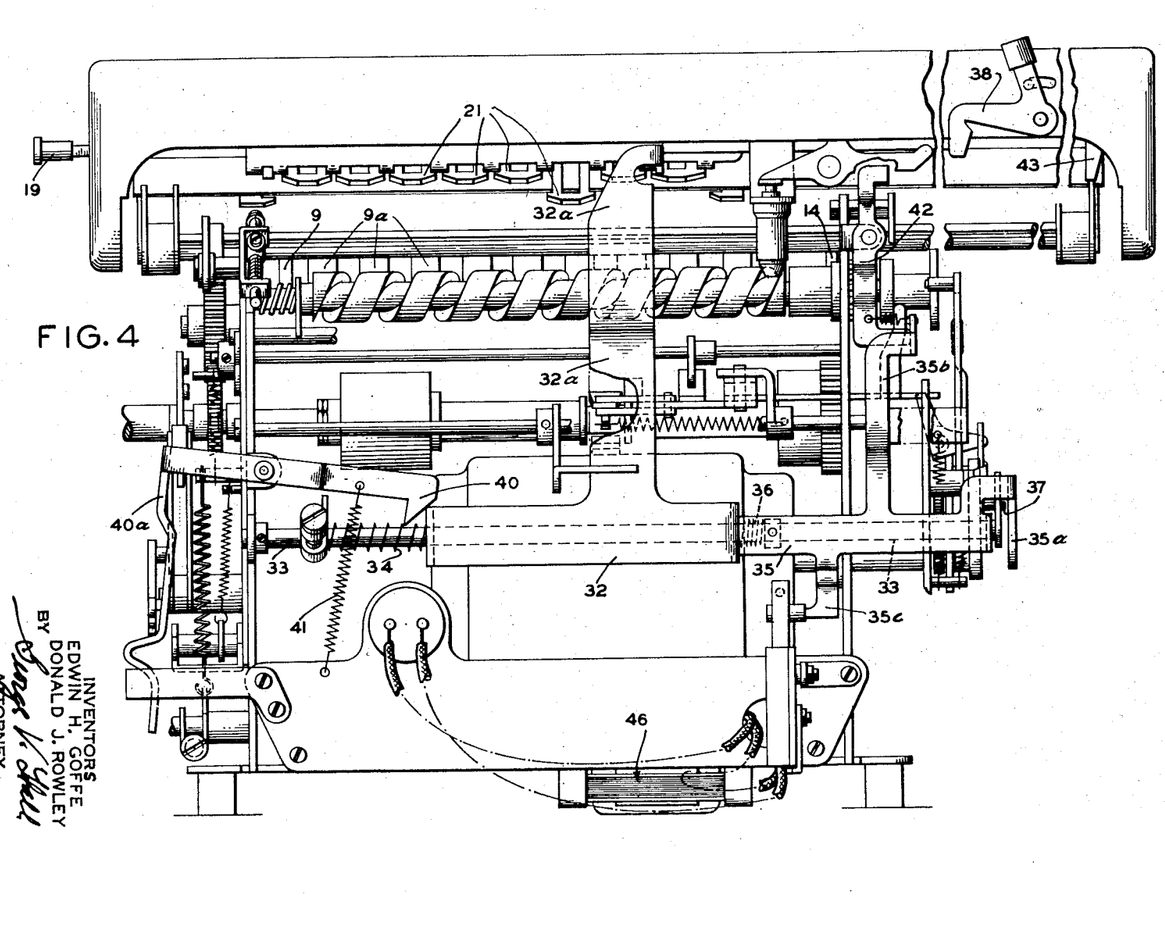
Fig. 4 is a rear view of the machine showing the setting and latching means for the devices of the invention.
Figure 5:
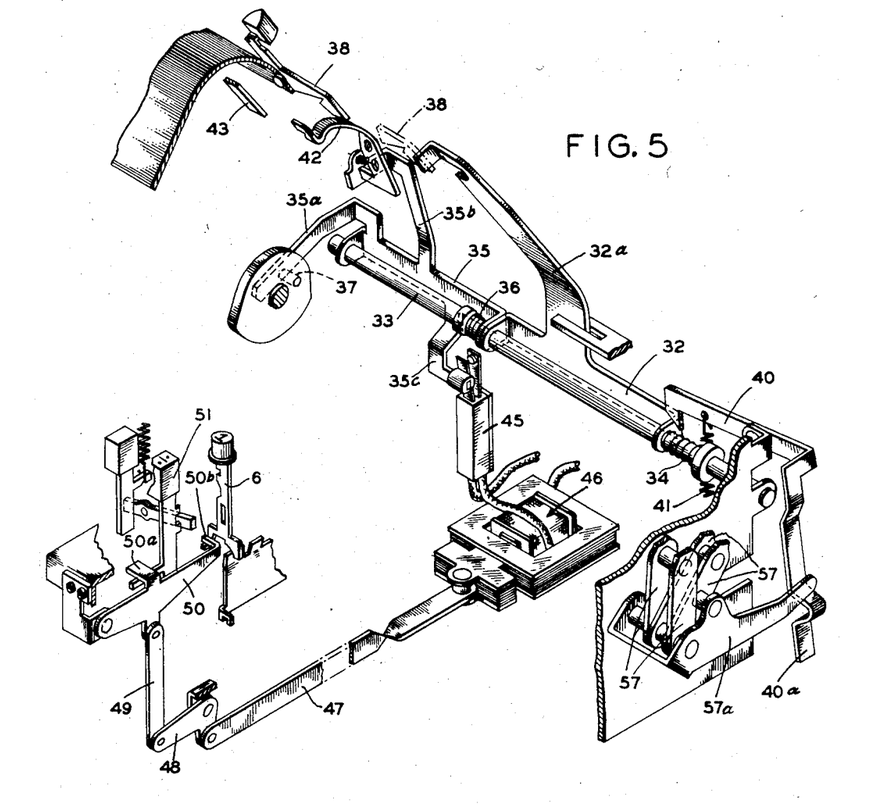
Fig. 5 is a fragmentary detail perspective showing one embodiment of the invention; and, Fig. 6 is a fragmentary detail view showing an alternate form of the invention.

A setting crank 38 is mounted on the rear of carriage 1 as best shown in Fig. 4. When setting crank 38 is rocked clockwise from the position shown in Fig. 4, it is rendered ineffective and upon movement of the carriage to its leftmost position as viewed in Fig. 4, a downwardly extending lug on the left arm of the crank will pass idly above arm 32a of member 32. However, when crank 38 is rocked to the position shown in Figs. 4 and 5, it will engage arm 32a upon movement of the carriage to its leftmost position as viewed in Fig. 4 and as shown in dot-dash lines in Fig. 5. Member 32 will therefore be moved toward the left (Fig. 4), toward the right (Fig. 5) against the tension of spring 34. Upon movement of member 32 spring 36 will tend to move member 35 in the same direction to engage the inner face of arm 35a with the end of pin 37 (Fig. 4). However, at this time such movement of member 35 is prevented by a lever 42. The lower end of lever 42 engages and is spring connected to a lug at the end of an upwardly extending arm 35b of member 35. When carriage 1 is moved to its left end position (Fig. 4), a tab 43 on carriage 1 will engage the upper end of lever 42 to prevent clockwise movement of the lever, which movement would be effected if member 35 were moved with member 32. Therefore, when the carriage is in the left end position, member 35 will be prevented movement from its normal position. However, when carriage 1 is moved toward the right (Fig. 4), tab 43 will be removed from engagement with lever 42 and member 35 will then be moved by spring 36 to engage arm 36a with the end of pin 37. An inclined end of a latch 40 engages the inwardly turned end of member 32. Therefore, upon movement of member 32 toward the left (Fig. 4) latch 40 will be rocked counterclockwise against the tension of the spring 41. The end of member 32 will thereafter pass beneath the active end of latch lever 40 which will then be restored clockwise to hold member 32 in adjusted position.

A roller at the end of a depending arm 35c of member 35 (Figs. 2, 4 and 5) engages one of a pair of switch blades of a switch 45. Therefore, should member 35 be rocked clockwise (Fig. 2), counterclockwise (Fig. 5) switch 45 will be closed to energize a solenoid 46. Solenoid 46 has link connection 47 (Figs. 2 and 5) with one arm of a crank 48. The other arm of crank 48 has link connection 49 with a pivotally mounted arm 50. Intermediate its ends, arm 50 has a lug 50a overlying a forward extension on the stem of divide key 51. The rearwardly extending free end of the arm 50 has a lug 50b overlying a forwardly bent portion of the stem of digit key "1" of the 7th order of keys 6 of the keyboard. It will be hereinafter explained the reason for the selection in the 7th order.

Upon energization of solenoid 46, link 47 will be moved toward the rear (Fig. 5) thereby rocking crank 48 counterclockwise to move link 49 downwardly and rock arm 50 clockwise. The digit key "1" will therefore be depressed to latched position and the divide key depressed to initiate a program of division. It will be noted that lug 50b, which is further from the fulcrum of arm 50 than is lug 50a, will be effective to depress digit key "1" to effect the selection before the divide key 51 is depressed.

*Operation*

In describing the operation the direction of carriage shift will be made with reference to Fig. 1 as the machine is normally viewed. The 6th order wheel 2 of the product dividend register is what is commonly known as a "half cent" wheel. This is the ordinal position in which it has been found most advantageous to locate this wheel. This "half cent" wheel will be cleared to 5 instead of to zero as are the other wheels 2 when a clearing operation for the register is effected. Therefore, if the registration of 5 or more is effected in the half cent dial, a tens transfer will be registered in the next highest order dial to register a full cent. This "half cent" wheel may be of any well known construction and its setting is controlled by a lever 53 (Fig. 1). In setting up the machine for operation in conjunction with the devices of the invention, a decimal marker will be positioned between the 8th and 9th orders of wheels 2 of the product dividend register to provide for the proper decimal relationship to the "half cent" wheel. As is well known, the decimals of a product are equal to the sum of the decimals of a multiplier and a multiplicand. Therefore, the factors of a multiplication problem will be set around a decimal marker 54 between the 4th and 5th orders of the keyboard. It is desirable to provide for maximum registering capacity for multiplier quotient wheels 3 and 4. Decimal markers for these wheels will, therefore, be set between the second and third orders. The number of decimals of a quotient are equal to the difference between the decimals of the dividend and the divisor. Therefore, as the decimal marker for the product dividend register provides for eight decimals, the divisor will be the digit key "1" of the 7th order of the keyboard.

Lever 31 will be adjusted to the position shown in Figs. 1 and 3 thereby moving change lever 30 to its intermediate position to disable the actuators for the multiplier quotient wheels 3, 4 during a multiplying operation. Lever 38 will be adjusted to its effective position. The 7th order tabular key 21 will then be depressed. Furthermore, control slide 29 will be adjusted to its leftmost position (Fig. 1) to provide for shift of carriage 1 to its rightmost position as an incidence to a multiplying operation. Button 19 will be adjusted to disable the clearing mechanism for the multiplier quotient wheels 4. The various controls will now have been adjusted so that a multiplying operation may be performed followed by a division by one to register the product in both wheels 3 and 4.

A multiplier will now be set around the decimal marker on the keyboard and multiplier setup key 25 will be depressed. If the carriage 1 is out of its leftmost position, it will be shifted thereto and the value set on the keyboard will be transferred to multiplier storage dials 24. The multiplicand will now be set on the keyboard around decimal marker 54 and multiplier key 27 will be depressed to initiate the multiplying operation. The multiplier storage dials 24 will be successively counted back to zero from lower to higher orders and, if there is no multiplier digit stored in the highest order storage dial 24, the carriage will be shifted to its rightmost position as provided for by the adjustment of slide 29. As the carriage is moved into its rightmost position, crank 38 will engage arm 32a of member 32 moving it to latched position on shaft 33.

As heretofore noted, when the carriage is in this end position, lever 42 will prevent adjustment of member 35 by spring 36. The devices may now be considered conditioned but not enabled. This provision must be made for reasons as follows. Operation of shift control clutch 20 (Fig. 2) through pin 37 and arm 35a will be effective to cause energization of solenoid 46 to depress divide key 51 as hereinafter described. If there were a digit stored in the highest order storage dial 24, a product registering operation would be effected with the carriage in its right-most position. Therefore, termination of the carriage shift in this position would operate the devices of the invention to institute a division operation before the completion of the multiplication operation if provision were not made to disable said devices.

As heretofore briefly dsecribed, a keyboard clearing operation is automatically effected when the carriage is shifted to its end position at the conclusion of the multiplying operation. This operation will initiate a return shift of the carriage. As the carriage is shifted from its end position, lever 42 will be released by tab 43 (Fig. 4) and spring 36 will now be effective to move member 35 in the same direction in which member 32 has been adjusted. At this time, shift control clutch 20 (Fig. 2) will have been moved clockwise in its first step of movement which is incidental to initiation of a carriage shift. Member 35 will therefore be adjusted toward the left (Fig. 4) to move its arm 35a into the path of movement of pin 37 mounted on the cam of clutch 20.

The return shift will be terminated in the position corresponding to the set tabular key 21 which, as heretofore noted, is the 7th position. When the shift is terminated, shift control clutch 20 will be operated to complete its cycle. During this operation of clutch 20, pin 37 will engage the upper edge of arm 35a near its end, thereby rocking the arm clockwise (Fig. 2), counterclockwise (Fig. 5). Pin 37 will then move past the end of arm 35a to release the parts. As arm 35a is rocked member 35 and depending arm 35c will be rocked accordingly and switch 45 will be closed to energize solenoid 46. Therefore, as heretofore described, digit key "1" of the 7th order of the keyboard and divide key 51 will be depressed, thereby instituting the program of division to register the value in product dividend wheels 2 into multiplier quotient wheels 3 and 4.

Upon the first registering cycle of the division operation, a pair of locator arms 57 (Fig. 3) will be moved outwardly by a full cycle locator cam 58 for the registering mechanism. Fixed to the right arm 57 is an arm 57a, the end of which will engage a cam face on a downwardly extending arm 40a of latch 40 (Figs. 3 and 4) when the locator arms are moved outwardly. This will operate to rock latch 40 counterclockwise (Fig. 4) to release member 32 and permit spring 34 to restore member 32 and member 35 toward the right to normal position. At the conclusion of the division program, the program of operations may be repeated to register the sum of a plurality of multiplying operations in the wheels 4 which will not be cleared upon operation of the clearing mechanism for wheels 3 upon depression of multiplier key 27.

Figure 6:
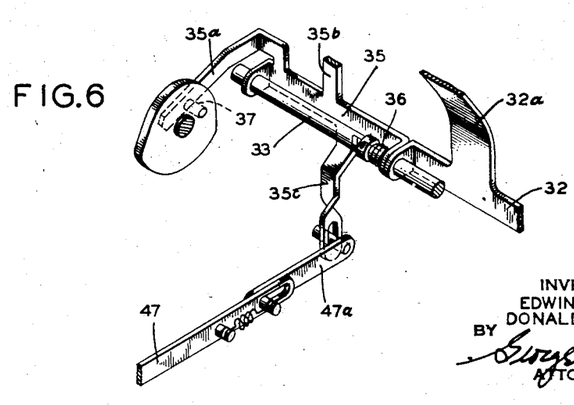

Fig. 6 of the drawings illustrates a modified form of the invention in which divide key 51 and the digit key "1" are depressed by direct mechanical connections in lieu of the electromagnetic means illustrated in Fig. 5. In this connection, link 47 is yieldably connected with a sub-link 47a which at its rear end has slot and pin connection with arm 35c of member 35 to permit adjustment of the member on shaft 33. The yieldable connection between links 47 and 47a permits continued movement of link 47a toward the rear when link 47 is prevented further rearward movement by full depression of divide key 51 and digit key "1." This arrangement assures that when member 35 is rocked by pin 37 the connected parts will be fully operated.

The invention has been disclosed as embodied in a particular type of calculating machine. It will be apparent, however, that the devices of the invention may be adapted, by those skilled in the art, for operation in other types of machines without departing from the principles of operation thereof. Furthermore, it may be desired in certain calculations in conjunction with the devices of the invention to effect the division by a value other than the digit "1." The invention, therefore, is to be restricted only as necessitated by the spirit of the appended claims.

We claim:

1. In a motor driven calculating machine having a register, actuating means including differentially operable actuators for said register, and settable digital value selection means for said differential actuators; the combination with a first and a second program control mechanism each respectively operable to control a program of operations including plural operation of said differential actuators; of normally disabled devices operable to effect the setting of a fixed digital value in said selection means and to initiate operation of the second said program control mechanism, means for enabling said devices, and means operable upon termination of operation of the first said program control mechanism to initiate operation of said enabled devices.

2. In a motor driven calculating machine having a product dividend register, a multiplier quotient register, actuating means including differentially settable actuators for said product dividend register, an actuator for said multiplier quotient register, drive control means for said actuator adjustable to enabling or to disabling position, means for adjusting said drive control means to disabling position, and digital value selection means for said differential actuators; the combination with multiplication control mechanism and division control mechanism including means for adjusting said actuator drive control means to enabling position; of normally disabled devices operable to effect the selection of a digital value by said selection means and to initiate a program of division, means for enabling said devices, and means operable upon termination of a program of multiplication to initiate operation of said enabled devices.

3. In a motor driven calculating machine having a product dividend register, a multiplier quotient register, actuating means including differentially settable actuators for said product dividend register, an actuator for said multiplier quotient register, drive control means for said actuator adjustable to enabling or disabling position, means for adjusting said drive control means to disabling position, and digital value selection means for said differential actuators; the combination with multiplication control mechanism and division control mechanism including means for adjusting said actuator drive control means to enabling position; of normally disabled devices operable to effect the selection of a digital value by said selection means and to initiate a program of division, means including a manually settable element operable in conjunction with a program of multiplication to enable said devices, and means operable upon termination of said program of multiplication to initiate operation of said enabled devices.

4. In a motor driven calculating machine having a shiftable carriage, mechanism for shifting said carriage, a product dividend register and a multiplier quotient register on said carriage, actuating means including differentially settable actuators for said product dividend register, an actuator for said multiplier quotient register, drive control means for said actuator adjustable to enabling or disabling position, means for adjusting said drive control means to disabling position, and digital value selection means for said differential actuators; the combination with multiplication control mechanism including means for controlling operation of said carriage shifting mechanism and division control mechanism including means for adjusting said actuator drive control means to enabling position; of normally disabled devices operable to effect the selection of a digital value by said selection means and to initiate a program of division, means including a manually settable element operable upon operation of said carriage shifting mechanism in connection with a program of multiplication to enable said devices, and means operable upon termination of said program of multiplication to initiate operation of said enabled devices.

5. The invention according to claim 4 wherein the manually settable element operable upon operation of the carriage shifting mechanism is mounted on the carriage.

6. The invention according to claim 4 wherein the means operable upon termination of a program of multiplication to initiate operation of the devices comprises the carriage shifting mechanism.

7. In a motor driven calculating machine having a shiftable register carriage, mechanism for shifting said carriage, a product dividend register on said carriage, a multiplier quotient register on said carriage, actuating means including differentially settable actuators for said product dividend register, an actuator for said multiplier quotient register, drive control means for said actuator adjustable to enabling or to disabling position, means for adjusting said drive control means to disabling position and digital value selection means for said differential actuators; the combination with multiplication control mechanism including means for controlling operation of said carriage shifting mechanism and division control mechanism including means for adjusting said actuator drive control means to enabling position; of normally disabled devices operable to effect the selection of a digital value by said selection means and to initiate a program of division, means including a manually settable element operable upon operation of said carriage shifting mechanism in connection with a program of multiplication to enable said devices, and means operable upon termination of said program of multiplication to initiate operation of said enabled devices.

8. In a motor driven calculating machine having a product dividend register, a multiplier quotient register, actuating means including differentially settable actuators for said product dividend register, an actuator for said multiplier quotient register, drive control means for said actuator adjustable to enabling or to disabling position, means for adjusting said drive control means to disabling position, and digital value selection means for said differential actuators including settable value selection members; the combination with multiplication control mechanism, and division control mechanism including means for adjusting said actuator drive control means to enabling position and a member settable to initiate the division operation; of electromagnetic means operable to set one of said value selection members and to set said division initiating member, a pair of normally open contacts for completing a circuit to said electromagnetic means, normally disabled devices operable to close said contacts, means for enabling said devices and means operable upon termination of a program of multiplication to initiate operation of said enabled devices.

9. In a motor driven calculating machine having a product dividend register, a multiplier quotient register, actuating means including differentially settable actuators for said product dividend register, an actuator for said multiplier quotient register, drive control means for said actuator adjustable to enabling or to disabling position, means for adjusting said drive control means to disabling position, and digital value selection means for said differential actuators including settable value selection members; the combination with multiplication control mechanism, and division control mechanism including means for adjusting said actuator drive control means to enabling position and a member settable to initiate the division operation; of a normally disabled linkage operable to set one of said value selection members and to set said division initiating member, motor driven means for operating said linkage, means for enabling said linkage, and means operable upon termination of a program of multiplication to initiate operation of said motor driven means.

10. In a motor driven calculating machine having a product dividend register, a multiplier quotient register, actuating means including differentially settable actuators for said product dividend register, an actuator for said multiplier quotient register, drive control means for said actuator adjustable to enabling or to disabling position, means for adjusting said drive control means to disabling position, and digital value selection means for said differential actuators; the combination with multiplication control mechanism and division control mechanism including means for adjusting said actuator drive control means to enabling position; of devices adjustable to disabled or to enabled position and operable to effect the selection of a digital value by said selection means and to initiate a program of division, spring means normally holding said devices in disabled position, means for adjusting said devices to enabled position against the tension of said spring means, a latch for holding said devices in enabled position, and means operable upon termination of a program of multiplication to initiate operation of said enabled devices.

11. The invention according to claim 10 wherein the latch is released upon operation of the machine in connection with the program of division.

12. In a motor driven calculating machine having a shiftable carriage, mechanism for shifting said carriage, a product dividend register and a multiplier quotient register on said carriage, actuating means including differentially settable actuators for said product dividend register, an actuator for said multiplier quotient register, drive control means for said actuator adjustable to enabling or to disabling position, means for adjusting said drive control means to disabling position, and digital value selection means for said differential actuators; the combination with multiplication control mechanism including means for causing said carriage to be shifted to a predetermined position at the conclusion of a multiplying operation and division control mechanism including means for adjusting said actuator drive control means to enabling position; of normally disabled devices operable to effect the selection of a digital value by said selection means and to initiate a program of division, and means operable in response to the shifting of said carriage to said predetermined position to enable and to initiate operation of said enabled devices.

13. In a motor driven calculating machine having a shiftable carriage, mechanism for shifting said carriage, a product dividend register and a multiplier quotient register on said carriage, actuating means including differentially settable actuators for said product dividend register, an actuator for said multiplier quotient register, drive control means for said actuator adjustable to enabling or to disabling position, and digital value selection means for said differential actuators; the combination with multiplication control mechanism including means for causing said carriage to be shifted to an end position at the conclusion of a multiplying operation and division control mechanism including means for adjusting said actuator drive control means to enabling position; of normally disabled devices operable to effect the selection of a digital value by said selection means and to initiate a program of division, means operable upon shifting of said carriage to said end position to condition said devices for enablement, and means thereafter operable to enable and to initiate operation of said enabled devices.

14. In a motor driven calculating machine having a product dividend register, a multiplier quotient register, actuating means including differentially settable actuators for said product dividend register, and digital value selection means for said differential actuators; the combination with multiplication control mechanism and division control mechanism; of normally disabled devices operable to effect the selection of a digital value by said selection means and to initiate a program of division, means for enabling said devices, and means operable upon termination of a program of multiplication to initiate operation of said enabled devices.

References Cited in the file of this patent

UNITED STATES PATENTS

| | | |
|---|---|---|
| 1,827,836 | Chase | Oct. 20, 1931 |
| 1,900,042 | Brown | Mar. 7, 1933 |
| 2,325,388 | Friden | July 27, 1943 |
| 2,328,610 | Bryce | Sept. 7, 1943 |
| 2,370,616 | Bryce | Mar. 6, 1945 |
| 2,408,097 | Pott | Sept. 24, 1946 |
| 2,687,254 | Hopkins | Aug. 24, 1954 |
| 2,736,494 | Ellerbeck | Feb. 28, 1956 |